May 22, 1951     J. W. PICKING     2,554,382
ELECTRIC MOTOR BRAKING SYSTEM
Filed July 24, 1946

INVENTOR.
BY Jay W. Picking
Woodling and Krost
Attys.

Patented May 22, 1951

2,554,382

UNITED STATES PATENT OFFICE 2,554,382

ELECTRIC MOTOR BRAKING SYSTEM

Jay W. Picking, Cleveland, Ohio, assignor to The Reliance Electric & Engineering Company, a corporation of Ohio Application July 24, 1946, Serial No. 685,946

18 Claims. (Cl. 318—368)

My invention relates in general to control systems and more particularly to control systems to control braking means of a direct current motor.

An object of my invention is to actuate braking means of a direct current motor upon disconnection of the motor from the rectifier device supplying power thereto.

Another object of my invention is to render operative braking means of a direct current motor whenever the electrical input to the motor becomes zero or negative.

Another object of my invention is to provide dynamic braking to a direct current motor being supplied from an alternating current source through a rectifier device whenever the electrical output of the motor exceeds the electrical input thereof.

Another object of my invention is the control of electrically controllable braking means of a direct current motor being supplied from a direct current voltage source having an alternating current component, wherein the braking means is rendered inoperative whenever the alternating current component appears across the armature of the motor, and wherein the braking means is rendered operative whenever the alternating current component does not appear across the armature.

Figure 1:
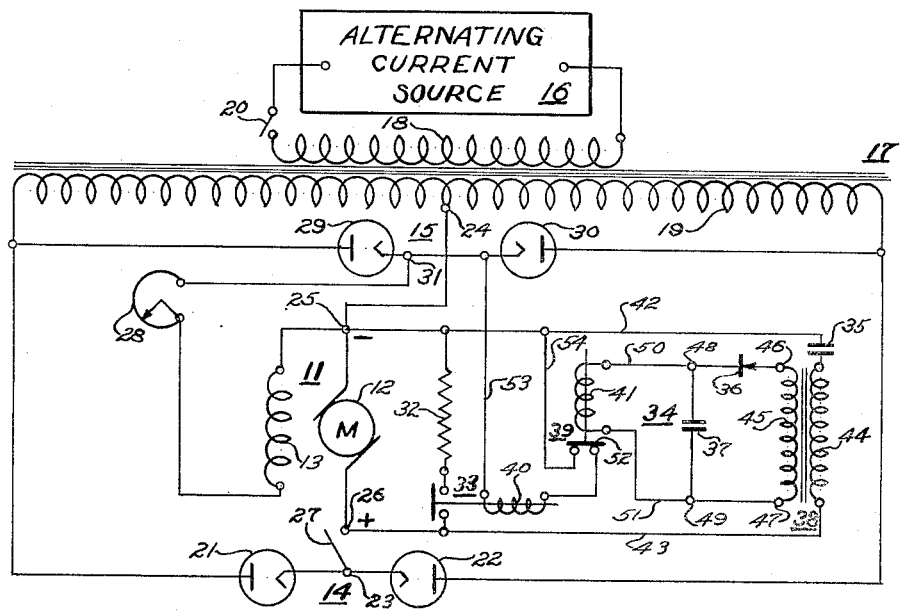
Figure 2:
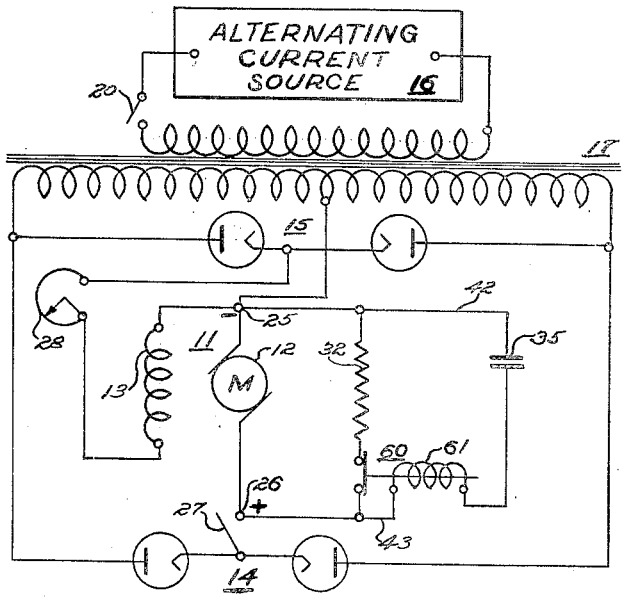

Other objects and a fuller understanding may be had by referring to the following description and claims taken in conjunction with the accompanying drawings in which:

Figure 1 diagrammatically depicts a control system for a direct current motor incorporating the preferred form of my invention; and Figure 2 is a diagrammatic representation of a control system for a direct current motor embodying the essential elements of my invention.

An inherent deficiency in the operation of a direct current motor from an alternating current source with a rectifying device therebetween is the fact that regenerative or dynamic braking is prevented due to the unidirectional current passing characteristic of the rectifier device. My invention relates to a combination of similar circuits for use with direct current motors being supplied from a rectifier device, and the intent is to automatically apply braking means to the motor whenever the rectifier device is not supplying electrical energy to the motor. My invention might be used with any rectifier device regardless of type or phase combination.

With reference to Figure 1, which shows the preferred form of my invention, a motor 11 has an armature 12 and a field 13. A first rectifier device 14 and a second rectifier device 15 supply rectified power to the armature 12 and field 13 respectively. An alternating current source 16 supplies power to both the first and second rectifier devices 14 and 15. A transformer 17 is connected between the alternating current source 16 and the rectifier devices 14 and 15. The transformer 17 has a primary 18 and a secondary 19, the primary 18 being connected to the alternating current source 16 through a power switch 20. The first rectifier device 14 may be of any suitable type and I have chosen a full wave electronic tube rectifier device, which includes a first rectifier tube 21 and a second rectifier tube 22. The rectifier tubes are of the conventional type having an anode and a cathode, the anodes being connected across the end terminals of the secondary 19 and the cathodes being connected together at a positive output terminal 23 of the first rectifier device 14. A midtap 24 on the secondary 19 is the negative output terminal of the first rectifier device 14. The armature 12 of the motor 11 has a first terminal 25 and a second terminal 26, the output of the first rectifier device 14 being connected to these terminals 25 and 26 of the armature 12 through a motor switch 27.

The field 13 of the motor 11 is supplied with excitation from the second rectifier device 15 through a rheostat 28. The second rectifier device 15 may be of any suitable type and I have shown a full wave electronic tube rectifier device including a third rectifier tube 29 and a fourth rectifier tube 30. These rectifier tubes 29 and 30 are of the conventional type having anodes and cathodes, the anodes being connected across the end terminals of the secondary 19 and the cathodes of the rectifier tubes being connected together at a positive output terminal 31 of the second rectifier device 15. The midtap 24 of the secondary 19 is also the negative terminal of the second rectifier device 15.

Braking means are provided for the motor 11, which in this preferred form of my invention includes a dynamic braking resistance 32 arranged to be shunted across the armature 12 by a switch means 33. The switch means 33 is actuated by a circuit actuating means indicated generally by the reference character 34, the actuating means 34 being responsive to the alternating current component across the armature 12. A condenser 35 is connected in series circuit arrangement with the actuating means 34 and this series circuit arrangement is connected across the terminals 25 and 26 of the armature 12 by the conductors 42 and 43, respectively. The condenser 35 prevents the passage of direct current through the actuating means 34, yet passes the alternating current component appearing across the armature 12. The actuating means 34 comprises generally a third rectifier device 36, a filter condenser 37, a transformer 38, an electrical relay 39 and electromagnetic means 40. The alternating current component across the armature 12 which is passed by the condenser 35 is transferred by the transformer 38 to the third rectifier device 36 and the filter condenser 37, which last two named circuit elements rectify and filter the alternating current component and apply it to a coil 41 of the electrical relay 39. The electrical relay 39 controls a circuit for energizing the electromagnetic means 40 from a secondary source, which in this case is the second rectifier device 15. The transformer 38 has a primary 44 and a secondary 45, and properly speaking, it is the primary 44 that is in series with the condenser 35 across the terminals of the armature 12. The secondary 45 has a first terminal 46 and a second terminal 47, and the condenser 37 has a first terminal 48 and a second terminal 49. The third rectifier device 36 is connected between the first terminals 46 and 48 of the secondary 45 and the condenser 37 respectively, and the second terminals 47 and 49 of the secondary 45 and the condenser 37 are connected together. The rectified and filtered alternating current component appearing across the terminals 48 and 49 of the condenser 37 is applied to the coil 41 of the electrical relay 39 through conductors 50 and 51. The electrical relay 39 has contactor means 52 controlled by the coil 41 thereof. The contactor means 52 makes or breaks a circuit for energizing the electromagnetic means 40 from the second rectifier device 15, and the contactor means 52 and the electromagnetic means 40 are connected in series to the positive and negative output terminals of the second rectifier device 15 by the conductors 53 and 54 respectively.

The operation of my control system for braking means will start with the assumption that the power switch 20 and the motor switch 27 are in an open position. Upon closing the power switch 20, the alternating current source 16 energizes the primary 18 of the transformer 17 with consequent energization of the secondary 19 thereof. The field 13 of the motor 11 is excited immediately upon closing the power switch 20 because the field excitation circuit through the field 13 is a closed circuit. When the motor switch 27 is closed, electrical energy is delivered from the first rectifier device 14 to the armature 12, and the motor will therefore come up to the speed governed by the setting of the rheostat 28. The electrical energy output of the first rectifier device 14 will be a direct current voltage with an alternating current component superimposed thereon. This alternating current component will necessarily appear across the terminals 25 and 26 of the armature 12, and because of the circuit connections this alternating current component will be passed by the condenser 35 to the actuating means 34 of the switch means 33. As hereinbefore stated the condenser 35 blocks the direct current voltage of the first rectifier device 14 from the actuating means 34, yet passes the alternating current component thereto. The alternating current component appears across the primary 44 of the transformer 38 and is transferred by the transformer 38 to the secondary 45 thereof. The third rectifier device 36 rectifies this alternating current component and the filter condenser 37 serves to reduce the magnitude of the alternating current fluctuations of voltage. This rectified and filtered alternating current component is applied to the coil 41 of the electrical relay 39. The coil 41 of the electrical relay 39 is operable on this rectified and filtered alternating current component and causes the contactor means 52 to open the circuit for energizing the electromagnetic means 40. Prior to the opening of the contactor means 52 of the electrical relay 39, a circuit was established from the output of the second rectifier device 15 through the electromagnetic means 40 of the switch means 33. This aforementioned circuit is therefore open and the electromagnetic means 40 is thereby not energized, so that the switch means 33 remains open. With the switch means 33 in an open position, the dynamic braking resistance 32 is not shunted across the armature 12. The effect of the actuating means 34 upon the switch means 33 is therefore such that when an alternating current component appears across the armature 12 the switch means 33 is permitted to remain in an open position; thereby the dynamic braking of the motor 11 is rendered inoperative.

The dynamic braking of the motor 11 is rendered operative, that is the dynamic braking resistance 32 is shunted across the armature 12, whenever an alternating current component fails to appear across the armature 12. This failure of an alternating current component to appear across the armature 12 may occur in any number of ways, the more common of which would be the opening of the motor switch 27, the lowering of the voltage of the alternating current source 16, or the increase of the counter electromotive force of the armature 12. With any of these conditions, there would be no alternating current component passed by the condenser 35 to the actuating means 34, and therefore the coil 41 of the electrical relay 39 would become de-energized, which would permit the contactor means 52 to close the circuit energizing the electromagnetic means 40 of the switch means 33, which electromagnetic means 40 would cause the switch means 33 to close and thereby shunt the dynamic braking resistance 32 across the armature 12. This phase of operation shows that when no alternating current component appears across the armature 12 the switch means 33 is caused to become closed, thereby rendering the braking means operative.

The actuating means 34 contains various circuit elements for reliable performance throughout a wide range of operation. Since the alternating current component appearing across the armature 12 is in many instances of quite small magnitude in comparison to the magnitude of the direct current voltage thereacross, positive control of the switch means 33 is difficult to obtain under all operating conditions. The electrical relay 39 is inserted in the actuating means 34 to enable the alternating current component to control a larger magnitude of power than it is in itself capable of delivering. The electrical relay 39 causes to be opened or closed a circuit deriving its power from the output of the second rectifier device 15 that energizes or de-energizes the electromagnetic means 40. The switch means 33 can therefore be made of large enough capacity to carry the comparatively larger current developed in the dynamic braking process. The third rectifier device 36 is inserted in the actuating means 34 in order to rectify the alternating current component because electrical relays will operate over a wider range of voltage on direct current than on alternating current. The filter condenser 37 has been inserted for reducing the magnitude of the alternating current fluctuations of voltage in the rectified alternating current component to help prevent hysteresis loss and saturation of the core of the coil 41. The transformer 38 can be so designed to permit saturation of the transformer to take place at a predetermined value of voltage thereby limiting the variations in voltage across the electrical relay coil 41. It has been found in practice that when the value of the dynamic braking resistance 32 is made small enough to permit a quite rapid deceleration of the motor 11, the change in volts per second of the counter electromotive force of the armature 12 is often sufficient to permit passage of this transient voltage through the condenser 35 to the actuating means 34, thereby energizing the coil 41 of the electrical relay 39 and de-energizing the electromagnetic means 40 of the switch means 33 causing the switch means 33 to open before the braking cycle is complete. The removal of the braking means will cause the deceleration rate of the motor 11 to become much less; therefore the rate of volts per second change in the counter electromotive force will be much less and the condenser 35 will not pass this transient; therefore the coil 41 of the electrical relay will become de-energized causing energization of the electromagnetic means 40 and consequent closing of the switch means 33. The closing of the switch means 33 would again cause rapid deceleration of the motor 11 and this might again cause the condenser 35 to pass a transient of sufficient magnitude to cause the switch means 33 to again open. These alternating tendencies would cause the switch means 33 to "chatter" or to open and close rapidly, alternately rendering the braking means operative and inoperative. Because of this tendency of the switch means 33 to chatter with a rapid deceleration rate of the motor 11, the third rectifier device 36 has been made a half-wave rectifier which passes current only on half cycles when the terminal 46 of the secondary 45 is positive with respect to the second terminal 47 thereof. As shown in Figure 1, the armature 12 has been so connected to the first rectifier device 14 such that the first terminal 25 of the armature 12 is negative with respect to the second terminal 26 thereof. With this connection, any direct current transient of the motor 11, such as caused by rapid deceleration, and passed by the condenser 35 will cause the first terminal 46 of the secondary 45 to be of negative polarity with respect to the second terminal 47 thereof. Therefore this transient will not be passed by the third rectifier device 36 to the coil 41 of the electrical relay 39. By so making the third rectifier device 36 a half-wave rectifier and so connecting it in the circuit, it therefore prevents chatter of the switch means 33, yet permits efficient operation of the coil 41 of the electrical relay 39 on the rectified and filtered alternating current component.

Figure 2 shows a modified form of my invention, wherein only the basic elements of my invention are incorporated into a control circuit for the braking means. As in Figure 1, an alternating current source 16 again supplies power through a power switch 20 and a transformer 17 to the first and second rectifier devices 14 and 15. These first and second rectifier devices again being full-wave electronic tube rectifying devices, which as hereinbefore mentioned might be any other form of rectifier device to supply direct current voltages to the field 13. As to the armature 12, the rectifier device might be any type wherein the direct current voltage has an alternating current component superimposed thereon. The motor 11 has the armature 12 supplied from the first rectifier device 14 through a motor switch 27, and the motor 11 has a field 13 supplied with excitation from the second rectifier device 15 through the rheostat 28. The dynamic braking resistance 32 is arranged to be shunted across the armature 12 by a switch means 60. The switch means 60 has an actuating means 61. A condenser 35 is connected in series circuit combination with the actuating means 61 and this series circuit combination is connected across the terminals 25 and 26 of the armature 12 by the conductors 42 and 43 respectively.

In operation of the circuit of Figure 2, the result obtained is the same as for the operation of the circuit of Figure 1. Upon closing the power switch 20, the field 13 of the motor 11 is supplied with excitation from the second rectifier device 15 and power is made available to the armature 12 to run the motor 11 from the first rectifier device 14 by the closing of the motor switch 27. As hereinbefore shown for the circuit of Figure 1, an alternating current component is superimposed upon the direct current voltage being supplied to the armature 11 by the first rectifier device 14. This alternating current component will be passed by the condenser 35 to the actuating means 61 of the switch means 60 causing energization of the actuating means 61, with a consequent opening of the switch means 60 and a removal of the braking means from the motor 11. When the alternating current component fails to appear across the armature 12 for any of such reasons as were enumerated in the description of operation of the circuit shown in Figure 1, there will necessarily be no alternating current component passed by the condenser 35 to the actuating means 61, so that the actuating means 61 will therefore become de-energized and the switch means 60 will close. Upon closing of the switch means 60 a circuit is effected which shunts the dynamic braking resistance 32 across the armature 12 of the motor 11, thereby rendering the braking means thereof operative. The ultimate result obtained in the operation of the circuit of Figure 2 is therefore identical to the result obtained for the operation of the circuit of Figure 1.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a control system for a direct current motor having an armature, braking means for the said motor, and a source of direct current voltage adapted to be connected to said armature, said direct current voltage having an alternating voltage component appearing across said armature, the provision of control means energizable only by said alternating voltage component across said armature for rendering said braking means inoperative, and means for preventing said alternating voltage component from appearing across said armature to render said braking means operative.

2. In a control system for a direct current motor having an armature, braking means for the said motor, and a source of direct current voltage adapted to be connected to said armature, said direct current voltage having an alternating voltage component appearing across said armature, the provision of control means energized by said alternating voltage component across said armature for rendering said braking means inoperative, means for preventing said alternating voltage component from appearing across said armature to render said braking means operative, and means to block said direct voltage from said control means.

3. In a control system for a direct current motor having an armature and a source of direct current voltage adapted to be connected to said armature, said direct current voltage having an alternating voltage component appearing across said armature, the provision of a braking system to brake the said motor including electrically controlled braking means, switch means having actuating means to open and close said switch means, said actuating means operable on alternating current, circuit means for applying only the alternating voltage component across said armature to said actuating means to open said switch means, and means to prevent said alternating voltage component from appearing across said armature to close said switch means to thus brake the said motor.

4. In a control system for a direct current motor having an armature and a source of direct current voltage to be connected to said armature, the said direct current voltage having an alternating voltage component appearing across said armature, the provision of a braking system to brake the said motor including a dynamic braking resistance, switch means for shunting said resistance across said armature to dynamically brake said motor, actuating means to open said switch means to remove said dynamic braking, the said actuating means operable on alternating current, a condenser, means for connecting said actuating means, said condenser, and said armature in closed series circuit arrangement, the said actuating means energizable by said alternating voltage component across said armature to open said switch means, and means for preventing said alternating voltage component from appearing across said armature to close said switch means and thereby dynamically brake said motor.

5. In a control system for electrically controllable braking means for a direct current motor, the provision of a rectifier device operable from alternating current and having output means to rectify the said alternating current, the said direct current motor having an armature connected to the output means of the said rectifier device, the said armature having an alternating voltage component appearing thereacross, switch means having actuating means operable on alternating current, a condenser, and circuit means for applying the said alternating voltage component appearing across said armature to the said condenser and the said actuating means in series arrangement, the said switch means controlling the said electrically controllable braking means.

6. In a control system for a direct current motor having an armature and a source of direct current voltage adapted to be connected to said armature, the said direct current voltage having an alternating voltage component appearing across said armature, the provision of a braking system to brake the said motor, the said braking system including a dynamic braking resistance, switch means having an actuating means, the said actuating means responsive only to the alternating voltage component appearing across said armature, and connection means for connecting said switch means, said dynamic braking resistance and said armature in closed series circuit arrangement.

7. In a control system for a direct current motor having an armature and a source of direct current voltage adapted to be connected to said armature, the said direct current voltage having an alternating voltage component appearing across said armature, the provision of a braking system to brake the said motor, the said braking system including a dynamic braking resistance, switch means having an actuating means, the said actuating means responsive to the alternating voltage component appearing across said armature, connection means for connecting said switch means, said dynamic braking resistance and said armature in closed series circuit arrangement, and means to block the said direct current voltage from the said actuating means.

8. In a control system for a direct current motor having an armature and a source of direct current voltage adapted to be connected to said armature, the said direct current voltage having an alternating voltage component appearing across said armature, the provision of a braking system to brake the said motor, the said braking system including a dynamic braking resistance, switch means, actuating means for the said switch means operable on alternating current, a condenser, means for connecting said switch means, said dynamic braking resistance and said armature in closed series circuit arrangement, and circuit means for connecting said condenser and said actuating means in series circuit combination and for applying to said series circuit combination the said alternating voltage component appearing across said armature.

9. In a control system for a direct current motor having an armature and a source of direct current voltage adapted to be connected to said armature, said direct current voltage having an alternating voltage component appearing across said armature, the provision of a braking system to brake the said motor, said braking system including a dynamic braking resistance, switch means, means to actuate said switch, the said means to actuate said switch being operable on alternating current, a condenser, means for connecting said switch means, said dynamic braking resistance and said armature in closed series circuit arrangement, circuit means for connecting said condenser, at least part of said actuating means and said armature in closed series circuit arrangement, the said actuating means energized by said alternating voltage component across said armature to open said switch means, and means to prevent said alternating voltage component from appearing across said armature to close said switch means and thereby dynamically brake said motor.

10. In a control system for electrically controllable braking means for a direct current motor, the provision of a first rectifier device operable from alternating current and having output means to rectify the said alternating current, the said direct current motor having an armature connected to the output means of the said rectifier device, the said armature having an alternating voltage component appearing thereacross, switch means having actuating means operable on alternating current, a condenser, and circuit means for applying the said alternating voltage component appearing across said armature to the said condenser and the said actuating means in series circuit arrangement, the said switch means controlling the said electrically controllable braking means, the said actuating means including second rectifier means to rectify the said alternating voltage component, transformer means connected between said circuit means and said second rectifier means to apply said alternating voltage component to said second rectifier means, means to filter said rectified alternating voltage component, and electromagnetic means operable on said rectified and filtered alternating voltage component for actuating said switch means.

11. In a control system for a direct current motor having an armature and a source of direct current voltage adapted to be connected to said armature, the said direct current voltage having an alternating voltage component appearing across said armature, the provision of a braking system to brake the said motor, the said braking system including a dynamic braking resistance, switch means, means to actuate said switch, the said actuating means being operable on alternating current, a condenser, first means for connecting said switch means, said dynamic braking resistance and said armature in closed series circuit arrangement, circuit means for connecting said condenser, said means to actuate said switch and said armature in closed series circuit arrangement, the said actuating means being energizable by said alternating voltage component across said armature to open said switch means, and means to prevent said alternating voltage component from appearing across said armature to close said switch means and thereby brake said motor, the said actuating means including means to rectify said alternating voltage component, means to filter said rectified alternating voltage component, and electromagnetic means operable on said rectified and filtered alternating voltage component for actuating said switch means.

12. In a control system for a direct current motor having an armature and a source of direct current voltage adapted to be connected to said armature, the said direct current voltage having an alternating voltage component appearing across said armature, the provision of a braking system to brake the said motor, the said braking system including a dynamic braking resistance, switch means, actuating means for the said switch means operable on alternating current, a condenser, means for connecting said switch means, said dynamic braking resistance and said armature in closed series circuit arrangement, and circuit means for connecting said condenser and said actuating means in series circuit combination and for applying the said alternating voltage component appearing across said armature to said circuit combination, the said actuating means including means to rectify said alternating voltage component, transformer means connected between said circuit means and said rectifier means to apply said alternating voltage component to said rectifier means, means to filter said rectified alternating voltage component, electromagnetic means for actuating said switch means, and electrical relay means operable on said rectified and filtered alternating voltage component to govern the said electromagnetic means.

13. A control system for an electrical device having a counter electromotive force, said system comprising, in combination, means for applying a direct current voltage having an alternating voltage component to said device, electro-magnetic means operable only on the alternating voltage component across said device to effect a control of said device, and circuit means for connecting said electromagentic means to said device to receive a voltage therefrom.

14. A control system for an electrical device having a counter electromotive force, said system comprising, in combination, means for applying a direct current voltage having an alternating voltage component to said device, actuating means operable on the alternating voltage component across said device to effect a control of said device, and means to permit only an alternating voltage to be applied to said actuating means from said device.

15. A control system for an electrical device having a counter electromotive force, said system comprising, in combination, means for applying a direct current voltage having an alternating voltage component to said device, circuit means including actuating means operable on the alternating voltage component across said device to effect a control of said device, and condenser means in said circuit means for passing alternating voltages to said actuating means from said device.

16. A control system for an electrical device having a counter electromotive force, said system comprising, in combination, means for applying an output voltage to said electrical device, said output voltage having a direct current component and an alternating current component, electromagnetic actuating means operable only on the alternating current component applied to said device to effect a control of said device, and circuit means for connecting said actuating means to said device.

17. A control system for an electrical device having a counter electromotive force, said system comprising, in combination, rectifier means operable from an alternating voltage source and having output means for applying a rectified output voltage to said electrical device, said rectified output voltage having a direct current component and an alternating current component, electromagnetic actuating means operable on the alternating current component applied to said device to effect a control of said device, and means to permit only an alternating voltage to be applied to said actuating means from said device.

18. A control system for an electrical device having a counter electromotive force, said system comprising, in combination, rectifier means operable from an alternating voltage source and having output means for applying a rectified output voltage to said electrical device, said rectified output voltage having a direct current component and an alternating current component, electromagnetic actuating means operable on the alternating current component applied to said device to effect a control of said device, circuit means for connecting said actuating means to said device, and means to block the direct current component from said actuating means.

JAY W. PICKING.

REFERENCES CITED

The following references are of record in the file of this patent:

UNITED STATES PATENTS

| Number | Name | Date |
|---|---|---|
| 1,027,126 | Hall | May 21, 1912 |
| 1,264,299 | Hellmund | Apr. 30, 1918 |
| 1,955,319 | Whittaker | Apr. 17, 1934 |
| 2,167,530 | Schneider | July 25, 1939 |
| 2,247,073 | Thompson | June 24, 1941 |